(12) United States Patent
Dai et al.

(10) Patent No.: US 9,025,538 B2
(45) Date of Patent: May 5, 2015

(54) METHOD AND SYSTEM FOR TRANSMITTING DOWNLINK CONTROL INFORMATION

(75) Inventors: Bo Dai, Shenzhen (CN); Xin Wu, Shenzhen (CN); Guanghui Yu, Shenzhen (CN); Weijun Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 183 days.

(21) Appl. No.: 13/257,859

(22) PCT Filed: Dec. 29, 2009

(86) PCT No.: PCT/CN2009/076189
§ 371 (c)(1),
(2), (4) Date: Mar. 19, 2012

(87) PCT Pub. No.: WO2011/032342
PCT Pub. Date: Mar. 24, 2011

(65) Prior Publication Data
US 2012/0195267 A1     Aug. 2, 2012

(30) Foreign Application Priority Data

Sep. 21, 2009   (CN) .......................... 2009 1 0171496

(51) Int. Cl.
*H04L 1/00*    (2006.01)
*H04W 28/04*    (2009.01)
(Continued)

(52) U.S. Cl.
CPC ............. *H04L 1/0072* (2013.01); *H04W 28/04* (2013.01); *H04W 48/08* (2013.01); *H04W 48/16* (2013.01)

(58) Field of Classification Search
CPC ......... H04W 72/00; H04W 28/00; H04L 1/00
USPC ................................................. 370/329, 252
See application file for complete search history.

(56) References Cited

U.S. PATENT DOCUMENTS

| | | | | |
|---|---|---|---|---|
| 2010/0115358 | A1* | 5/2010 | Kotecha et al. | 714/748 |
| 2010/0279628 | A1* | 11/2010 | Love et al. | 455/70 |
| 2011/0035639 | A1* | 2/2011 | Earnshaw et al. | 714/748 |

FOREIGN PATENT DOCUMENTS

| | | |
|---|---|---|
| CN | 101330372 A | 12/2008 |
| CN | 101478808 A | 7/2009 |

(Continued)

OTHER PUBLICATIONS

InterDigital Communcations, LLC, DL Control Signaling for LTE Rel-9 Dual-Layer Beamforming, 3GPP TSG RAN WG1 Meeting #58, Aug. 24-28, 2009, pp. 1-6, R1-093066.*

(Continued)

*Primary Examiner* — Andrew Lai
*Assistant Examiner* — Sumitra Ganguly
(74) *Attorney, Agent, or Firm* — Oppedahl Patent Law Firm LLC

(57) ABSTRACT

The present disclosure discloses a method and system for transmitting downlink control information, for solving the problem of how to indicate a transmission scheme when a cyclic redundancy check code in the downlink control channel is scrambled with the semi-persistently scheduled cell radio network temporary identifier. In order to support the bi-flow beam forming technology in the LTE-A R9, the present disclosure provides a downlink control information Format 1A, which may, when the cyclic redundancy check code in the downlink control channel is scrambled with the semi-persistently scheduled cell radio network temporary identifier, indicates a method for transmitting downlink control information, for example, single-layer transmission, transmit diversity, or a transmission scheme simultaneously involving single-layer transmission and transmit diversity, which guarantees flexibility of system schedule. The present disclosure adds no signaling overhead and has good adaptability with the LTE R8.

16 Claims, 3 Drawing Sheets

(51) Int. Cl.
*H04W 48/08* (2009.01)
*H04W 48/16* (2009.01)

(56) References Cited

FOREIGN PATENT DOCUMENTS

| CN | 101505498 A | 8/2009 |
|---|---|---|
| CN | 101541063 A | 9/2009 |
| JP | H11306014 A | 11/1999 |
| JP | 2002247629 A | 8/2002 |
| JP | 2003032177 A | 1/2003 |
| JP | 2005277612 A | 10/2005 |
| JP | 2010190633 A | 9/2010 |
| WO | 2009025525 A1 | 2/2009 |
| WO | 2009041785 A2 | 4/2009 |

OTHER PUBLICATIONS

Nokia, Nokia Siemens Networks, DL Control Signaling for LTE Rel-9 Dual-Layer Beamforming in Rel'9, 3GPP TSG RAN WG1 Meeting #57 bis, Jun. 29-Jul. 3, 2009, pp. 1-6, R1-092553.*

Motorola, Control Signaling for LTE Rel-9 Enhanced DL transmission, 3GPP TSG RAN WG1 Meeting #58, Aug. 24-28, 2009, pp. 1-7, R1-093406.*

Nokia, "DL Control Signalling for Dual-layer Beamforming in Rel'9", Los Angeles, USA, Jun. 29-Jul. 3, 2009, R1-092553.*

InterDigital Communications, "DL Control Signalling for LTE Rel-9 Dual-Layer Beamforming", Shenzhen, China, Aug. 24-28, 2009, R1-093066.*

Motorola, "Control Signalling for LTE Rel-9 Enhanced DL transmission", Shenzhen, China, Aug. 24-28, 2009, R1-093408.*

DL Control Signalling for Dual-layer Beamforming in Rel'9 Jul. 3, 2009.

Supplementary European Search Report in European application No. 09849393.5, mailed on Mar. 12, 2013.

DL Control Signaling for LTE Rel-9 Dual-Layer Beamforming, 3GPP Draft Aug. 19, 2009.

Control Signaling for LTE Rel-9 Enhanced DL transmission, 3GPP Draft Aug. 19, 2009.

DL Control Signaling for Dual-layer BF in LTE Rel-9, 3GPP Draft Oct. 5, 2009.

International Search Report in international application No. PCT/CN2009/076189, mailed on Jul. 1, 2010.

English Translation of the Written Opinion of the International Search Authority in international application No. PCT/CN2009/076189, mailed on Jul. 1, 2010.

* cited by examiner

METHOD AND SYSTEM FOR TRANSMITTING DOWNLINK CONTROL INFORMATION

TECHNICAL FIELD

The present disclosure relates to the field of mobile wireless communications, and in particular relates to a method and system for transmitting downlink control information.

BACKGROUND

A radio frame in a Long Term Evolution (LTE) system may have a frame structure of a Frequency Division Duplex (FDD) mode or a frame structure of a Time Division Duplex (FDD) mode. For the frame structure of FDD mode, as shown in FIG. 1, a 10 ms radio frame is composed of 20 time slots, all of which have a length of 0.5 ms and are numbered from 0 to 19, and time slots $2i$ and $2i+1$ form subframe i with a length of 1 ms. For the frame structure of TDD mode, as shown in FIG. 2, a 10 ms radio frame is composed of two half frames with a length of 5 ms, each half frame comprises 5 subframes with a length of 1 ms, subframe i is defined as two time slots $2i$ and $2i+1$ with a length of 0.5 ms. In the above two frame structures, for a Normal Cyclic Prefix (Normal CP), a time slot comprises 7 symbols with a length of 66.7 μs, wherein the CP length of the first symbol is 5.21 μs, and the CP length of each of the remaining 6 symbols is 4.69 μs; for an Extended Cyclic Prefix (Extended CP), a time slot comprises 6 symbols, with the CP length of each of these symbols being 16.67 μs.

The version number of the LTE corresponds to R8 (Release 8) and its enhanced version corresponds to the version number R9 (Release 9). The LTE defines the following three types of downlink physical control channels: a Physical Control Format Indicator Channel (PCFICH); a Physical Hybrid Automatic Repeat Request Indicator Channel (PHICH); and a Physical Downlink Control Channel (PDCCH).

The information carried by the PCFICH is used for indicating the number of Orthogonal Frequency Division Multiplexing (OFDM) symbols for transmitting the PDCCH in a subframe and is sent by the first OFDM symbol of the subframe, and a frequency location of the information is determined by the system downlink bandwidth and a cell identity (ID).

The PHICH is for carrying ACK/NACK feedback information of uplink transmitted data. The number and time-frequency location of the PHICH may be determined by a system message and a cell ID in a Physical Broadcast Channel (PBCH) of a downlink carrier where the PHICH is located.

The PDCCH is for carrying Downlink Control Information (DCI) which comprises uplink and downlink scheduling information, and uplink power control information. The DCI Format comprises DCI Format 0, DCI Format 1, DCI Format 1A, DCI Format 1B, DCI Format 1C, DCI Format 1D, DCI Format 2, DCI Format 2A, DCI Format 3, DCI Format 3A, etc.

DCI Format 0 is for indicating scheduling of a Physical Uplink Shared Channel (PUSCH);

DCI Format 1, DCI Format 1A, DCI Format 1B, DCI Format 1C, and DCI Format 1D are for indicating different modes of scheduling of one PDSCH codeword;

DCI Format 2 and DCI Format 2A are for indicating diffident modes of space division multiplexing;

DCI Format 3 and DCI Format 3A are for indicating different modes of power control instructions of a Physical Uplink Control Channel (PUCCH) and a PUSCH.

Further, information transmitted in DCI Format 1A is as follows:

(1) 1 bit for selecting DCI Format 0 or DCI Format 1A;

(2) 1 bit for selecting a resource assignment scheme of a Localized Virtual Resource Block (LVRB) or a Distributed Virtual Resource Block (DVRB);

(3) $\lceil \log_2 (N_{RB}^{DL}(N_{RB}^{DL}+1)/2) \rceil$ bits for resource block assignment, wherein $N_{RB}^{DL}$ denoting a downlink bandwidth, represented by the number of Resource Blocks (RB);

(4) 5 bits for indicating a Modulation and Coding Scheme (MCS);

(5) in an FDD system, 3 bits for indicating Hybrid Automatic Repeat Request (HARQ) process number; in a TDD system, 4 bits for indicating HARQ process number;

(6) 1 bit for a New Data Indicator (NDI);

(7) 2 bits for indicating a redundant Version (RV);

(8) 2 bits for Transmit Power Control (TPC) of the PUCCH;

(9) 2 bits for Downlink Assignment Index (DI), which is only needed in uplink and downlink configuration of the TDD system, but is not needed in the FDD system; and

(10) 16 bits for a Cyclic Redundancy Check (CRC).

Physical resources transmitted over the PDCCH takes a Control Channel Element (CCE) as a unit, the size of which is nine Resource Element Groups (REG), i.e., 36 resource elements, and one PDCCH may occupy 1, 2, 4, or 8 CCEs. For four PDCCHs occupying 1, 2, 4, and 8 CCEs respectively, a tree aggregation is adopted, i.e., the PDCCH occupying 1 CCE may start from any CCE location; the PDCCH occupying 2 CCEs starts from an even CCE location; the PDCCH occupying 4 CCEs starts from a CCE location of an integer multiple of 4; and the PDCCH occupying 8 CCEs starts from a CCE location of an integer multiple of 8.

Each aggregation level defines a search space comprising a common search space and a user equipment specific (UE-specific) search space. The number of CCEs in the entire search space is determined by the number of OFDM symbols occupied by control areas indicated by the PCFICH in each downlink subframe and the number of groups of the PHICHs. The UE performs blind detection in the search space on all possible PDCCH bit rates based on a DCI format of a transmission mode of itself.

The UE is semi-statistically configured through high-level signaling to receive PDSCH data transmission according to an indication of a PDCCH in the UE-specific search space based on at least one of the following transmission modes:

Mode 1: Single-antenna port: port 0

Mode 2: Transmit diversity

Mode 3: Open-loop spatial multiplexing

Mode 4: Closed-loop spatial multiplexing

Mode 5: Multi-user Multiple-Input Multiple-Out-put (MIMO)

Mode 6: Closed-loop Rank=1 precoding

Mode 7: Single-antenna port: port 5

If the UE is configured by the high level to decode a PDCCH with a Cyclical Redundancy Check (CRC) scrambled with a Cell Radio Network Temporary Identifier (C-RNTI), then the UE should decode the PDCCH and all relevant PDSCHs according to a corresponding combination as defined in Table 1.

TABLE 1

| UE downlink transmission mode | DCI Format | Search space | corresponding PDSCH transmission scheme of PDCCH |
|---|---|---|---|
| Mode 1 | DCI Format 1A | Common and C-RNTI-defined UE specific | Single-antenna port: port 0 |
|  | DCI Format 1 | C-RNTI-defined UE specific | Single-antenna port: port 0 |
| Mode 2 | DCI Format 1A | Common and C-RNTI-defined UE specific | Transmit diversity |
|  | DCI Format 1 | C-RNTI-defined UE specific | Transmit diversity |
| Mode 3 | DCI Format 1A | Common and C-RNTI-defined UE specific | Transmit diversity |
|  | DCI Format 2A | C-RNTI-defined UE specific | Open-loop spatial multiplexing or transmit diversity |
| Mode 4 | DCI Format 1A | Common and C-RNTI-defined UE specific | Transmit diversity |
|  | DCI Format 2 | C-RNTI-defined UE specific | Closed-loop spatial multiplexing or transmit diversity |
| Mode 5 | DCI Format 1A | Common and C-RNTI-defined UE specific | Transmit diversity |
|  | DCI Format 1D | C-RNTI-defined UE specific | Multi-user MIMO |
| Mode 6 | DCI Format 1A | Common and C-RNTI-defined UE specific | Transmit diversity |
|  | DCI Format 1B | C-RNTI-defined UE specific | Closed-loop Rank = 1 precoding |
| Mode 7 | DCI Format 1A | Common and C-RNTI-defined UE specific | If the number of PBCH antenna ports is 1, using a single-antenna port: port 0; otherwise, using transmit diversity |
|  | DCI Format 1 | C-RNTI-defined UE specific | Single-antenna port: port 5 |

If the UE is configured by the high level to decode a PDCCH with a CRC scrambled by a Semi-Persistently Scheduled Cell Radio Network Temporary Identifier (SPS C-RNTI), then the UE should decode the PDCCH and all relevant PDSCHs according to a corresponding combination as defined in Table 2:

TABLE 2

| UE downlink transmission mode | DCI Format | Search space | corresponding PDSCH transmission scheme of PDCCH |
|---|---|---|---|
| Mode 1 | DCI Format 1A | Common and C-RNTI-defined UE specific | Single-antenna port: port 0 |
|  | DCI Format 1 | C-RNTI-defined UE specific | Single-antenna port: port 0 |
| Mode 2 | DCI Format 1A | Common and C-RNTI-defined UE specific | Transmit diversity |
|  | DCI Format 1 | C-RNTI-defined UE specific | Transmit diversity |
| Mode 3 | DCI Format 1A | Common and C-RNTI-defined UE specific | Transmit diversity |
|  | DCI Format 2A | C-RNTI-defined UE specific | Transmit diversity |
| Mode 4 | DCI Format 1A | Common and C-RNTI-defined UE specific | Transmit diversity |
|  | DCI Format 2 | C-RNTI-defined UE specific | Transmit diversity |
| Mode 5 | DCI Format 1A | Common and C-RNTI-defined UE specific | Transmit diversity |
| Mode 6 | DCI Format 1A | Common and C-RNTI defined-UE specific | Transmit diversity |
| Mode 7 | DCI Format 1A | Common and C-RNTI defined-UE specific | Single-antenna port: port 5 |
|  | DCI Format 1 | C-RNTI-defined UE specific | Single-antenna port: port 5 |

Particularly, when the UE is configured to decode a PDCCH with a CRC scrambled by an SPS C-RNTI and semi-static scheduling is activated, information bits of the DCI Format 1A will change as follows:

(1) in the 5 bits for indicating a Modulation And Coding Scheme (MCS), the bit of the Most Significant Bit (MSB), i.e., the utmost left bit, will be set to be 0;

(2) the 3 bits for indicating HARQ process number in the FDD system and the 4 bits for indicating HARQ process number will be set to be 0;

(3) the 1 bit for a New Data Indicator (NDI) will be set to be 0;

(4) the 2 bits for indicating a Redundant Version (RV) will be set to be 0.

In the transmission mode 7, a single antenna port 5-based transmission is a non-codebook spatial multiplexing manner with Rank=1 and also is application of a single-layer beam-forming technology; while currently, in order to enhance the performance of the downlink non-codebook transmission manner, a new transmission scheme is provided in the LTE enhanced version R9, which is a non-codebook spatial multiplexing manner with Rank=2, i.e., a dual-antenna-port transmission adopting a dual-layer beamforming technology.

Therefore, it is necessary to define a new transmission mode in R9 to correspond to the dual-layer beamforming technology. As defined in R8, this new transmission mode needs two DCI formats, wherein in the common search space and the C-RNTI-defined UE-specific search space, DCI Format 1A is required to be adopted. However, in the existing technical solution, a transmission scheme as well as how to indicate the transmission scheme are not determined in the DCI Format 1A, thereby bringing about inconvenience to practical application.

SUMMARY

The present disclosure is to provide a method and system for transmitting Downlink Control Information (DCI), so as to solve a technical problem of how to indicate a transmission scheme when a cyclic redundancy check code in a downlink control channel is scrambled with a Semi-Persistently Scheduled Cell Radio Network Temporary Identifier (SPS C-RNTI).

In order to solve the above problem, the present disclosure provides a method for transmitting DCI, wherein when a cyclic redundancy check code in a downlink control channel is scrambled with an SPS C-RNTI, the method comprises the following steps:

generating DCI by a base station based on DCI Format 1A that is used for indicating a transmission scheme of corresponding Physical Downlink Shared Channel (PDSCH) of DCI;

receiving the DCI and acquiring the DCI according to the DCI Format 1A by a UE;

wherein the transmission scheme comprises: a single-layer transmission scheme, a transmit diversity transmission scheme, and a transmission scheme simultaneously involving a single-layer transmission and transmit diversity, wherein the single-layer transmission may be a single-antenna-port transmission scheme.

Preferably, when the transmission scheme indicated by the DCI Format 1A is a single-layer transmission scheme, the DCI Format 1A may further comprise signaling for indicating an antenna port;

when the transmission scheme indicated by the DCI Format 1A is a transmission scheme simultaneously involving a single-layer transmission and transmit diversity, the DCI Format 1A may further comprise signaling for indicating whether the current transmission scheme is a single-layer transmission scheme or a transmit diversity transmission scheme, and for indicating an antenna port in the case of a single-layer transmission;

wherein the transmission scheme comprises: a single-layer transmission scheme, a transmit diversity transmission scheme, and a transmission scheme involving a single-layer transmission and transmit diversity, wherein the single-layer transmission may be a single-antenna-port transmission scheme.

when the transmission scheme indicated by the DCI Format 1A is a transmission scheme involving a single-layer transmission and transmit diversity, the DCI Format 1A may further comprise signaling for indicating whether the current transmission scheme is a single-layer transmission scheme or a transmit diversity transmission scheme, and for indicating an antenna port in the case of a single-layer transmission;

the single-layer transmission may be a single-antenna-port transmission scheme.

Preferably, the antenna port may be antenna port M, or antenna port N.

Preferably, the DCI Format 1A may further comprise the following indication signaling: HARQ process number signaling bits, a NDI signaling bit, RV signaling bits, or a MSB signaling bit of MCB signaling bits.

Preferably, when the DCI Format 1A is for indicating a single-layer transmission, the signaling for indicating an antenna port may be any one bit in the HARQ process number signaling bits, the NDI signaling bit, the RV signaling bits, and the MSB signaling bit of the MCB signaling bits, where the any one bit is used to determine whether the single-antenna port in the single-layer transmission is antenna port M or antenna port N.

Preferably, a first bit in any two bits may be used to distinguish the transmit diversity from the single-layer transmission, and a second bit may be used to determine whether the single-antenna port is antenna port M or antenna port N in the case of the single-layer transmission; or united coding of the any two bits is used to distinguish transmit diversity from a single-layer transmission, and to determine whether the single-antenna port is antenna port M or antenna port N in the case of the single-layer transmission, where the united coding scheme may be that: "00" indicates transmit diversity, "01" indicates a single-layer transmission and its corresponding antenna port M, "10" indicates a single-layer transmission and its corresponding antenna port N, and "11" is reserved.

Preferably, the DCI Format 1A may further comprise the following signaling: Format 0 or Format 1A selection signaling, resource assignment scheme selection signaling, resource block assignment signaling, TPC signaling, DAI signaling, and CRC signaling.

The DCI Format 1A may only indicate a single-layer transmission, and the antenna port corresponding to this layer may be a fixed antenna port. The fixed antenna port may be antenna port M, or antenna port N, or antenna port 5, and the antenna port M and N are port 7 and port 8, respectively.

The present disclosure also provides a system for transmitting downlink control information (DCI), comprising a base station and a user equipment (UE), wherein the base station is configured for, when a cyclic redundancy check code in a downlink control channel is scrambled with an SPS C-RNTI, generating DCI according to DCI Format 1A, and sending the DCI to the UE, where the DCI Format 1A is for indicating a transmission scheme of corresponding Physical Downlink Shared Channel (PDSCH) of DCI, comprising one of the following schemes: a single-layer transmission scheme, or a transmit diversity transmission scheme, or a transmission scheme involving a single-layer transmission and transmit diversity, wherein the single-layer transmission may be a single-antenna-port transmission scheme:

the UE is configured for, after receiving the DCI, acquiring the DCI according to the DCI Format 1A.

Preferably, when the transmission scheme as indicated by the DCI Format 1A is a single-layer transmission scheme, the DCI Format 1A may further comprise signaling for indicating an antenna port;

when the transmission scheme as indicated by the DCI Format 1A is a transmission scheme simultaneously involving a single-layer transmission and transmit diversity, the DCI Format 1A may further comprise singling for indicating whether the current transmission scheme is a single-layer transmission scheme or a transmit diversity transmission scheme, and further indicating an antenna port in the case of a single-layer transmission.

when the transmission scheme as indicated by the DCI Format 1A is a transmission scheme involving a single-layer transmission and transmit diversity, the DCI Format 1A may further comprise signaling for indicating whether the current transmission scheme is a single-layer transmission scheme or a transmit diversity transmission scheme, and further indicating an antenna port in the case of a single-layer transmission.

The single-layer transmission may be a single-antenna-port transmission scheme. The antenna port is newly defined antenna port M or antenna port N.

Preferably, the signaling for indicating an antenna port in the DCI Format 1A may comprise: HARQ process number signaling bits, a NDI signaling bit, RV signaling bits, or a MSB signaling bit of MCB signaling bits.

Preferably, when the DCI Format 1A is for indicating a single-layer transmission scheme, the signaling for indicating an antenna port may be any one bit in the HARQ process number signaling bits, the NDI signaling bit, the RV signaling bits, and the MSB signaling bit of the MCB signaling bits, where the any one bit is used for determining whether the single-antenna port in the single-layer transmission is antenna port M or antenna port N.

Preferably, when the DCI Format 1A is for indicating a transmission scheme simultaneous involving a single-layer transmission and transmit diversity, any two bits in the HARQ process number signaling bits, the NDI signaling bit, the RV signaling bits, and the MSB signaling bit of the MCB signaling bits may be adopted to distinguish the transmit diversity from the single-layer transmission and to determine whether the single-antenna port corresponding to the single-layer transmission is antenna port M or antenna port N, where a first bit in the two bits may be for distinguishing the transmit diversity from the single-layer transmission, and a second bit may be for determining whether the single-antenna port is antenna port M or antenna port N in the case of the single-layer transmission. United coding of the any two bits may be adopted to distinguish the transmit diversity from the single-layer transmission and to determine whether the single antenna port is antenna port M or antenna port N in the case of the single-layer transmission, and the united coding scheme may be that: "00" indicates transmit diversity, "01" indicates a single-layer transmission and its corresponding antenna port M, "10" indicates a single-layer transmission and its corresponding antenna port N, and "11" is reserved.

Preferably, the DCI Format 1A may further comprise the following signaling: Format 0 or Format 1A selection signaling, resource assignment scheme selection signaling, resource block assignment signaling, TPC signaling, DAI signaling, and CRC signaling.

Preferably, the DCI Format 1A may only indicate a single-layer transmission, and the antenna port corresponding to this layer may be a fixed antenna port. The fixed antenna port may be antenna port M or antenna port N, or antenna port 5. The antenna ports M and N may be port 7 and port 8, respectively.

In the method and system for transmitting DCI according to the present disclosure, in order to support the dual-layer beamforming technology in the LTE-A R9, DCI Format 1A is defined, which can indicate a single-layer transmission (here, the single-layer transmission refers to a single-antenna-port transmission scheme) or a transmission scheme involving a single-layer transmission and transmit diversity when a cyclic redundancy check code in a downlink control channel is scrambled with an SPS C-RNTI, thus guaranteeing the flexibility of system scheduling.

The present disclosure distinguishes a single-layer transmission from transmit diversity and determines an antenna port in the case of a single-layer transmission by modifying the definitions of some signaling bits in DCI Format 1A in LTE R8 without adding any system complexity and signaling overheads, and without greatly affecting the system performance, thereby overcoming the disadvantage in the prior art. On the other hand, since the DCI Format 1A in the R9 succeeds to that of the LTE R8, with only modifying the definitions of several bits therein, it has good compatibility with the LTE R8.

DETAILED DESCRIPTION

In order to make the objective, technical solution and advantage of the present disclosure clearer, detailed descriptions will be made hereinafter in conjunction with the accompanying drawings.

Figure 1:
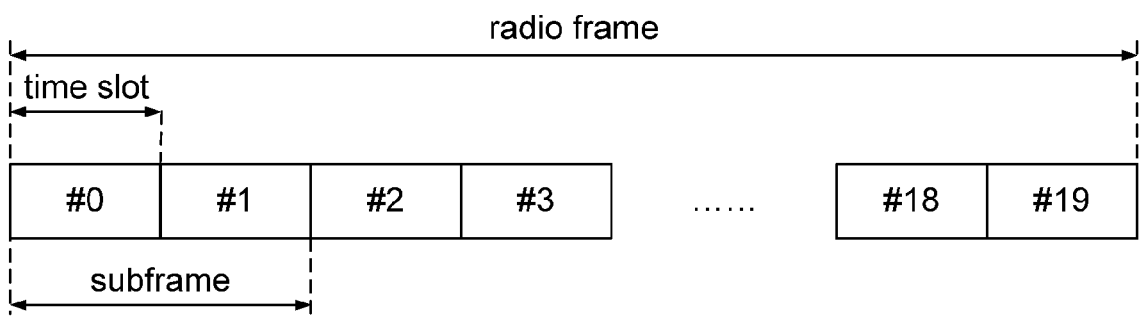
FIG. 1 is a schematic diagram illustrating a frame structure of an FDD mode in the prior art.
Figure 2:
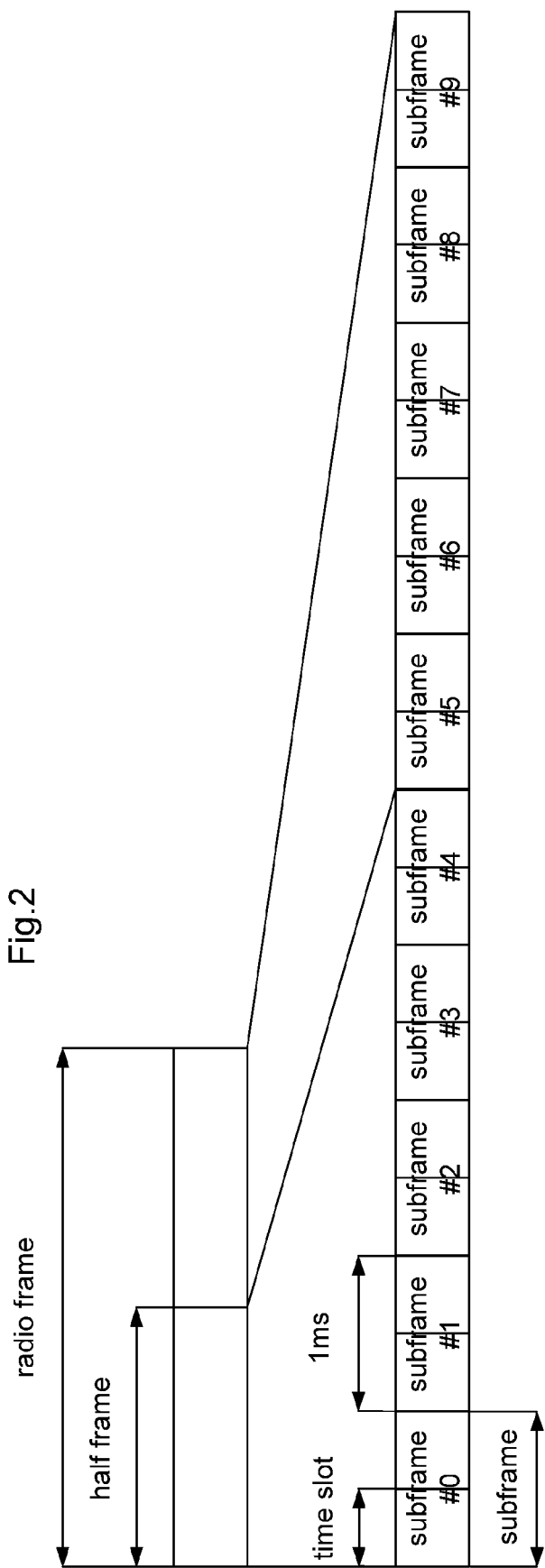
FIG. 2 is a schematic diagram illustrating a frame structure of a TDD mode in the prior art.
Figure 3:
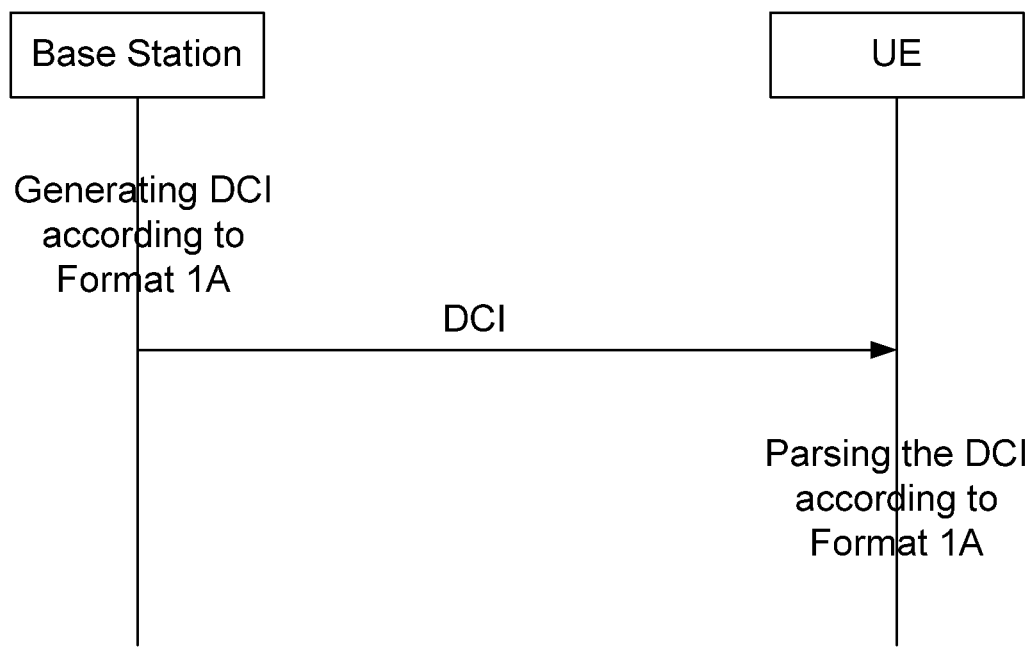
FIG. 3 is a schematic diagram illustrating a system for transmitting downlink control information in the prior art.

The present disclosure provides a method and system for transmitting Downlink Control Information (DCI), as shown in FIG. 3, where when a cyclic redundancy check code in a downlink control channel is scrambled with a Semi-Persistently Scheduled Cell Radio Network Temporary Identifier (SPS C-RNTI). DCI Format 1A is defined, and a base station generates the DCI according to the DCI Format 1A, wherein the DCI Format 1A may indicate whether the downlink transmission scheme is a single-layer transmission (herein the single-layer transmission refers to a single-antenna-port transmission scheme), or transmit diversity, or a transmission scheme involving a single-layer transmission and transmit diversity.

According to the method for transmitting DCI, a base station generates DCI according to DCI Format 1A that indicates a transmission scheme of corresponding Physical Downlink Shared Channel (PDSCH) of DCI, and the transmission scheme comprises one of the following schemes: a single-layer transmission scheme, a transmit diversity transmission scheme, and a transmission scheme involving a single-layer transmission and transmit diversity: wherein the single-layer transmission is a single-antenna-port transmission scheme:

a User Equipment (UE) receives the DCI and acquires the DCI in accordance with the DCI Format 1A.

Preferably, the DCI Format 1A comprises: Format 0 or Format 1A selection signaling, resource assignment scheme selection signaling, resource block assignment signaling, MCS signaling, HARQ process number signaling, NDI signaling, RV signaling, TPC signaling, DAI signaling, and CRC signaling.

Preferably, the DCI Format 1A may only indicate a single-layer transmission, and moreover the antenna port corresponding to this layer is a fixed antenna port, for example, the fixed antenna port corresponding to the single layer is antenna port M, or antenna port N, or antenna port 5.

Preferably, the DCI Format 1A may be used to indicate that the downlink transmission scheme is a single-layer transmission, and moreover, the signaling in the DCI Format 1A further indicates an antenna port. For example, the MSB signaling bit of the MCS signaling bits may be used to indicate an antenna port.

Preferably, the signaling in the DCI Format 1A is used to indicate whether the downlink transmission scheme is transmit diversity or a single-layer transmission, and to indicate an antenna port in the case of a single-layer transmission, all of which, for example, are indicated by the two bits of the RV signaling in the DCI Format 1A.

This kind of DCI Format 1A as defined in the present disclosure can be used to indicate a single-layer transmission (here, the single-layer transmission refers to a single-antenna-port transmission scheme) or a transmission scheme involving a single-layer transmission and transmit diversity, and further, specific signaling in the DCI Format 1A is used to indicate these transmission schemes, thereby overcoming the drawbacks in the prior art.

Based on the above method, the present disclosure further provides a system for transmitting DCI. As shown in FIG. 3, the system comprises a base station and a UE.

The base station is for, when a cyclic redundancy check code in a downlink control channel is scrambled with an SPS C-RNTI, generating DCI according to DCI Format 1A, and sending the DCI to the UE, wherein the DCI Format 1A may be used for indicating a single-layer transmission scheme, or a transmit diversity transmission scheme, or a transmission scheme involving a single-layer transmission and transmit diversity, wherein the single-layer transmission is a single-antenna-port transmissions scheme:

the UE acquires the corresponding DCI according to the DCI Format 1A when the cyclic redundancy check code scrambled with an SPS C-RNTI is used to decode a physical downlink control channel and the decoding is successful.

Signaling for indicating a transmission scheme in the DCI Format 1A comprises: HARQ process number signaling bits, a NDI signaling bit, RV signaling bits, or a MCS signaling bit of MSB signaling bits, wherein when the above signaling is used to indicate a single-layer transmission scheme, further, any one bit in the above signaling may be used to indicate an antenna port in the case of the single-layer transmission, for example, one bit in the above signaling is used to indicate whether the single-antenna port in the single-layer transmission is port M or port N.

If the above signaling indicates transmit diversity and a single-layer transmission, any two bits may be used to indicate the transmit diversity and the single-layer transmission. Further, the two bits may also be used to indicate whether the corresponding antenna port in the case of the single-layer transmission is port M or port N.

The first indication manner is that: a first bit in the two bits is for indicating whether the transmission is a transmit diversity or a single-layer transmission, and a second bit is for indicating whether the corresponding single-antenna port is port M or port N in the case of the single-layer transmission.

The second indication manner is that: the two bits adopt united coding to indicate whether the transmission is a transmit diversity or a single-layer transmission, and to indicate whether the corresponding single-antenna port is port M or port N in the case of the single-layer transmission.

The DCI Format 1A may be used to only indicate a single-layer transmission, and moreover, the antenna port corresponding to this layer is a fixed antenna port, for example, the fixed antenna port corresponding to the single layer is antenna port M, or antenna port N, or, antenna port 5.

The DCI Format 1A further includes the following signaling: Format 0 or Format 1A selection signaling, resource assignment scheme selection signaling, resource block assignment signaling, TPC signaling, DAI signaling, and CRC signaling.

Hereinafter, the method and system according to the present disclosure will be described in detail in conjunction with preferred embodiments.

In R9, in order to support the dual-layer beamforming technology, it is necessary to add new transmission mode X, X preferably being 8. Meanwhile, for a dual-antenna-port transmission scheme used for dual-layer beamforming, it is necessary to define two new antenna ports, antenna port M and antenna port N, and moreover, M and N preferably being 7 and 8, or 6 and 7.

For the dual-layer beamforming technology and its corresponding transmission mode X as evolved in R9, the present disclosure defines DCI Format 1A, which may be used in the common search space and the C-RNTI-defined UE specific search space, and when a cyclic redundancy check code in a downlink control channel is scrambled with an SPS C-RNTI, the DCI Format 1A is for indicating a single-layer transmission (here, the single-layer transmission refers to a single-antenna-port transmission scheme), or a transmission scheme involving a single-layer transmission and transmit diversity.

The information fields as included in DCI Format 1A and their corresponding sizes are shown in Table 3:

TABLE 3

| PDCCH Field | Bits |
| --- | --- |
| Format 0/1 A flag | 1 |
| Localized/Distributed RA flag | 1 |
| RB assignment | $\lceil \log_2 (N_{RB}^{DL} (N_{RB}^{DL}+1)/2) \rceil$ |
| MCS | 5 |

TABLE 3-continued

| PDCCH Field | Bits |
| --- | --- |
| HARQ Process Number (ID) | 3 (FDD), 4 (TDD) |
| NDI | 1 |
| RV | 2 |
| TPC | 2 |
| DAI | 2 (TDD only) |
| CRC | 16 |

In the following embodiments, a plurality of methods for indicating different transmission schemes with DCI Format 1A will be illustrated, wherein the downlink transmission mode X is for indicating the downlink transmission mode corresponding to the newly added antenna port M and antenna port N in the R9 standard version, for example X may be 8, M may be 7, and N may be 8.

Embodiment 1

Indication Format 1A Only Corresponds to a Transmit Diversity Transmission Scheme In this embodiment, in the common search space and the C-RNTI-defined UE specific search space, when a cyclic redundancy check code in a downlink control channel is scrambled with an SPS C-RNTI, for example, the UE is configured by the high level to decode the PDCCH with the SPS C-RNTI-scrambled CRC, DCI Format 1A may be used to indicate a transmit diversity transmission scheme, as shown in Table 4:

TABLE 4

| UE downlink transmission mode | DCI Format | Search space | corresponding PDSCH transmission scheme of PDCCH |
| --- | --- | --- | --- |
| Mode X | DCI Format 1A | Common and C-RNTI-defined UE specific | Transmit diversity |

Embodiment 2

Indication Format 1A Only Corresponds to a Single-Antenna-Port Transmission Scheme, and Moreover the Antenna Port is Fixed In this embodiment, in the common search space and C-RNTI-defined UE specific search space, when a cyclic redundancy check code in a downlink control channel is scrambled with an SPS C-RNTI, for example when the UE is configured by the high level to decode the PDCCH with the SPS C-RNTI-scrambled CRC, DCI Format 1A may be used to indicate a single-layer transmission scheme. Here, the single-layer transmission refers to a single-antenna-port transmission scheme, and its corresponding antenna port has the following plurality of configurations:

Configuration 1: The single-antenna port corresponding to DCI Format 1A is fixed to be port 5, whose configuration scheme in mode X is shown in Table 5:

TABLE 5

| UE downlink transmission mode | DCI Format | Search space | corresponding PDSCH transmission scheme of PDCCH |
|---|---|---|---|
| Mode X-PDCCH and PDSCH configured by SPS C-RNTI | DCI Format 1A | Common and C-RNTI-defined UE specific | Single-antenna port: port 5 |

Configuration 2: The single-antenna port corresponding to DCI Format 1A is fixed to be port M (M may be 7), whose configuration scheme in mode X is shown in Table 6:

TABLE 6

| UE downlink transmission mode | DCI Format | Search space | corresponding PDSCH transmission scheme of PDCCH |
|---|---|---|---|
| Mode X-PDCCH and PDSCH configured by SPS C-RNTI | DCI Format 1A | Common and C-RNTI-defined UE specific | Single-antenna port: port M |

Configuration 3: The single-antenna port corresponding to DCI Format 1A is fixed to be port N (N may be 8), whose configuration scheme in mode X is shown in Table 7:

TABLE 7

| UE downlink transmission mode | DCI Format | Search space | corresponding PDSCH transmission scheme of PDCCH |
|---|---|---|---|
| Mode X-PDCCH and PDSCH configured by SPS C-RNTI | DCI Format 1A | Common and C-RNTI-defined UE specific | Single-antenna port: port N |

Embodiment 3

Indication Format 1A Only Corresponds to a Single-Antenna-Port Transmission Scheme and an Antenna Port Signaling Indication In this embodiment, in the common search space and C-RNTI-defined UE specific search space, when a cyclic redundancy check code in a downlink control channel is scrambled with an SPS C-RNTI, for example, when the UE is configured by the high level to decode the PDCCH with the SPS C-RNTI-scrambled CRC, the DCI Format 1A may be used to indicate a single-layer transmission scheme. Here, the single-layer transmission refers to a single-antenna-port transmission scheme, in which the corresponding antenna port is port M or port N.

When the UE is configured by the high level to decode the PDCCH with the SPS C-RNTI-scrambled CRC and the semi-persistently scheduling is activated, the HARQ Process Number (ID) signaling bits, the NDI signaling bit, and the RV signaling bits and the MSB signaling bit of the MCS signaling bits in DCI Format 1A are all set to be 0, i.e., these signaling bits are used as Virtual Cyclic Redundancy Check (Virtual CRC) bits to decrease the error detection probability of the system rather than play other roles. Therefore, one of the above signaling bits may be used to indicate whether the single-antenna port in the single-layer transmission is port M or port N, which affects little to the performance of the system. For example, "0" indicates the single-antenna port M, while "1" indicates the single-antenna port N, as shown in Table 8:

TABLE 8

| MSB bit of MCS bits | Antenna port in a single-layer transmission |
|---|---|
| 0 | Single-antenna port M |
| 1 | Single-antenna port N |

Or, "0" indicates the single-antenna port N, while "1" indicates the single-antenna port M.

Therefore, the configuration scheme of DCI Format 1A in mode X is shown in Table 9:

TABLE 9

| UE downlink transmission mode | DCI Format | Search space | corresponding PDSCH transmission scheme of PDCCH |
|---|---|---|---|
| Mode X-PDCCH and PDSCH configured by SPS C-RNTI | DCI Format 1A | Common and C-RNTI-defined UE specific | Single-antenna port: port M or N |

Embodiment 4

Indication Format 1A only corresponds to a transmission scheme involving a single-layer transmission and a transmit diversity, and an antenna port signaling indication in the case of the single-layer transmission In this embodiment, in the common search space and C-RNTI-defined UE specific search space, when a cyclic redundancy check code in a downlink control channel is scrambled with an SPS C-RNTI, for example, when the UE is configured by the high level to decode the PDCCH with the SPS C-RNTI-scrambled CRC, DCI Format 1A may be used to indicate a single-layer transmission scheme or a transmit diversity transmission scheme. Here, the single-layer transmission refers to a single-antenna-port transmission scheme, and its corresponding antenna port may be port M or port N.

When the UE is configured by the high level to decode the PDCCH with the SPS C-RNTI-scrambled CRC and the semi-static scheduling is activated, the HARQ Process Number (ID) signaling bits, the NDI signaling bit, and the RV signaling bits and the MSB bit of the MCS signaling bits in DCI Format 1A are all set to be 0, i.e., these signaling bits are used as Virtual CRC bits to decrease the error detection probability of the system rather than play other roles. Therefore, two bits in the signaling bits may be used to distinguish transmit diversity from a single-layer transmission, and to indicate whether the port corresponding to the single-layer transmission is single-antenna port M or port N, which affects little to the system performance. Preferably, the two signaling bits of the RV may be used to distinguish the transmit diversity from the single-layer transmission, and to indicate the single-antenna port corresponding to the single-layer transmission.

For example, a first signaling bit of the RV is used to distinguish a transmit diversity transmission scheme from a single-layer transmission scheme, with "0" indicating the transmit diversity transmission scheme, and "1" indicating the single-layer transmission scheme, as shown in Table 10:

TABLE 10

| First signaling bit of RV | Transmission scheme |
|---|---|
| 0 | Transmit diversity |
| 1 | Single-layer transmission |

Or, "0" indicates the single-layer transmission scheme, while "1" indicates the transmit diversity transmission scheme.

A second signaling bit of the RV is used to indicate an antenna port in the case of the single-layer transmission, with "0" indicating the single-antenna port M and "1" indicating the single-antenna port N, as shown in Table 11:

TABLE 11

| Second signaling bit of RV | Antenna port in a single-layer transmission |
|---|---|
| 0 | Antenna port M |
| 1 | Antenna port N |

Or, "0" indicates the single-antenna port N, while "1" indicates the single-antenna port M.

The first and second signaling bits of the RV may be exchangeable.

The two signaling bits of the RV may also be used for, through united coding, distinguishing transmit diversity from a single-layer transmission, and distinguishing antenna port M from antenna port N in the single-layer transmission. For example, "00" is used to indicate the transmit diversity, "01" is used to indicate the antenna port M in the single-layer transmission, "10" is used to indicate the antenna port N in the single-layer transmission, and "11" is reserved, as shown in Table 12:

TABLE 12

| Two signaling bits of RV | Transmission scheme |
|---|---|
| 00 | Transmit diversity |
| 01 | Single-antenna port transmission, and the corresponding antenna port is antenna port M |
| 10 | Single-antenna port transmission, and the corresponding antenna port is antenna port N |
| 11 | Reserved |

Or, other combination manners can also be used for indication. The above example is only one thereof, which is not used to limit the use of the RV signaling bits.

Therefore, the configuration scheme of DCI Format 1A in mode X is shown in Table 13:

TABLE 13

| UE downlink transmission mode | DCI Format | Search space | corresponding PDSCH transmission scheme of PDCCH |
|---|---|---|---|
| Mode X-PDCCH and PDSCH configured by the SPS C-RNTI | DCI Format 1A | Common and C-RNTI-defined UE specific | Transmit diversity, or Single-antenna port: port M or N |

To sum up, the present disclosure, when a cyclic redundancy check code in a downlink control channel is scrambled with an SPS C-RNTI, defines DCI Format 1A for the new transmission mode X that corresponds to the dual-layer beamforming technology in R9 for indicating a single-layer transmission scheme, or a transmission scheme involving both single-layer transmission and transmit diversity, which guarantees the flexibility of system scheduling. Further, without increasing system complexity and adding signaling overheads, definitions of several signaling bits of DCI Format 1A in R8 are modified to distinguish the single-layer transmission scheme from the transmit diversity transmission scheme, as well as distinguish antenna ports (port M or N) in case of the single-layer transmission without affecting system performance greatly. On the other hand, since the DCI Format 1A in the R9 succeeds to that of the LTE R8, with only modifying the definitions of several bits therein, it has good compatibility with the LTE R8.

What is described above are only embodiments of the present disclosure, but not for limiting the present disclosure. To those skilled in the art, the present disclosure may have various alternations and changes. Any modifications, equivalent substitutions and improvements to be made without departing from the spirit and principle of the present disclosure should be within scope of the appended claims.

The invention claimed is:

1. A method for transmitting Downlink Control Information (DCI), comprising: when a cyclic redundancy check code in a downlink control channel is scrambled with a Semi-Persistently Scheduled Cell Radio Network Temporary Identifier (SPS C-RNTI),
generating DCI by a base station according to DCI Format 1A of a transmission mode with antenna ports 7 and 8, wherein the DCI Format 1A is used for indicating a transmission scheme of corresponding Physical Downlink Shared Channel (PDSCH) as indicated by the DCI;
receiving, by a user equipment, the DCI and acquiring the DCI according to the DCI Format 1A;
wherein the transmission scheme supported by the DCI Format 1A is only a single-layer transmission scheme, or only a transmit diversity transmission scheme, or a transmission scheme involving both a single-layer transmission and transmit diversity; wherein the single-layer transmission scheme is a single-antenna-port transmission scheme;
when the transmission scheme supported by the DCI Format 1A is only the single-antenna-port transmission scheme and a single-antenna port is a fixed antenna port, the fixed antenna port is the antenna port 7; and
when the transmission scheme supported by the DCI Format 1A is only the single-antenna-port transmission scheme and the single-antenna port is a signaling indicated antenna port, the DCI Format 1A comprises indication signaling for indicating the single-antenna port, and the indication signaling comprises: Hybrid Automatic Repeat Request (HARQ) process number signaling bits, or a New Data Indicator (NDI) signaling bit, or Redundant Version (RV) signaling bits.

2. The method according to claim 1, wherein
when the transmission scheme supported by the DCI Format 1A is the transmission scheme involving both a single-layer transmission and transmit diversity: the DCI Format 1A comprises indication signaling for indicating whether a current transmission scheme is a single-layer transmission scheme or a transmit diversity transmission scheme, and indicating the single-antenna port when the current transmission scheme is a single-layer transmission scheme; wherein, the indication signaling comprises: Hybrid Automatic Repeat Request (HARQ) process number signaling bits, or a New Data Indicator (NDI) signaling bit, or Redundant Version (RV) signaling bits, or Most Significant Bit (MSB) signaling bits of Modulation and Coding Scheme (MCS) signaling bits.

3. The method according to claim 2, wherein when the transmission scheme supported by the DCI Format 1A is the transmission scheme involving both a single-layer transmission and transmit diversity, any two bits of the following signaling bits are used to distinguish the transmit diversity from the single-layer transmission and to determine whether the single-antenna port corresponding to the single-layer transmission is antenna port 7 or antenna port 8: the HARQ process number signaling bits, the NDI signaling bit, the RV signaling bits, and the MSB signaling bits of the MCS signaling bits.

4. The method according to claim 3, wherein a first bit in the any two bits is used to distinguish the transmit diversity from the single-layer transmission, and a second bit is used to determine whether the single-antenna port is antenna port 7 or antenna port 8 in the case of the single-layer transmission.

5. The method according to claim 2, wherein the DCI Format 1A further comprises the following signaling: Format 0 or Format 1A selection signaling, resource assignment scheme selection signaling, resource block assignment signaling, Transmit Power Control (TPC) signaling, Downlink Assignment Index (DAI) signaling, and Cyclic Redundancy Check (CRC) signaling.

6. The method according to claim 3, wherein united coding of the any two bits is used to distinguish transmit diversity from a single-layer transmission, and in the case of the single-layer transmission, to determine whether the single-antenna port is antenna port 7 or antenna port 8.

7. The method according to claim 6, wherein the united coding scheme is: "00" indicating transmit diversity, "01" indicating a single-layer transmission and its corresponding antenna port 7, "10" indicating a single-layer transmission and its corresponding antenna port 8, and "11" being reserved.

8. The method according to claim 1, wherein the indication signaling for indicating the single-antenna port is any one bit of the following signaling bits: the HARQ process number signaling bits, the NDI signaling bit, the RV signaling bits, and the MSB signaling bits of the MCS signaling bits; wherein the any one bit is used for determining whether the single-antenna port in the single-layer transmission is antenna port 7 or antenna port 8.

9. A system for transmitting Downlink Control Information (DCI), comprising a base station and a user equipment; wherein:
the base station is configured for, when a cyclic redundancy check code in a downlink control channel is scrambled with a semi-persistently scheduled cell radio network temporary identifier (SPS C-RNTI), generating DCI according to DCI Format 1A of a transmission mode with antenna ports 7 and 8, and sending the DCI to a user equipment, wherein the DCI Format 1A is used for indicating a transmission scheme of corresponding Physical Downlink Shared Channel (PDSCH) as indicated by the DCI; wherein the transmission scheme supported by the DCI Format 1A is only a single-layer transmission scheme, or only a transmit diversity transmission scheme, or a transmission scheme involving both a single-layer transmission and transmit diversity; wherein the single-layer transmission is a single-antenna-port transmission scheme; and
the user equipment is configured for acquiring the DCI according to the DCI Format 1A after receiving the DCI;
when the transmission scheme supported by the DCI Format 1A is only the single-antenna-port transmission scheme and a single-antenna port is a fixed antenna port, the fixed antenna port is antenna port 7; and
when the transmission scheme supported by the DCI Format 1A is only the single-antenna-port transmission scheme and the single-antenna port is a signaling indicated antenna port, the DCI Format 1A comprises indication signaling for indicating the single-antenna port, and the indication signaling comprises: Hybrid Automatic Repeat Request (HARQ) process number signaling bits, or a New Data Indicator (NDI) signaling bit, or Redundant Version (RV) signaling bits.

10. The system according to claim 9, wherein when the transmission scheme supported by the DCI Format 1A is the transmission scheme involving both a single-layer transmission and transmit diversity: the DCI Format 1A comprises indication signaling for indicating whether a current transmission scheme is a single-layer transmission scheme or a transmit diversity transmission scheme, and indicating the single-antenna port when the current transmission scheme is a single-layer transmission scheme; wherein, the indication signaling comprises: Hybrid Automatic Repeat Request (HARQ) process number signaling bits, or a New Data Indicator (NDI) signaling bit, or Redundant Version (RV) signaling bits, or Most Significant Bit (MSB) signaling bits of Modulation and Coding Scheme (MCS) signaling bits.

11. The system according to claim 10, wherein when the transmission scheme supported by the DCI Format 1A is the transmission scheme involving both a single-layer transmission and transmit diversity, any two bits of the following signaling bits are used to distinguish the transmit diversity from the single-layer transmission and to determine whether the single-antenna port corresponding to the single-layer transmission is antenna port 7 or antenna port 8: the HARQ process number signaling bits, the NDI signaling bit, the RV signaling bits, and the MSB signaling bits of the MCS signaling bits.

12. The system according to claim 11, wherein a first bit in the any two bits is used to distinguish the transmit diversity from the single-layer transmission, and a second bit is used to determine whether the single-antenna port is antenna port 7 or antenna port 8 in the case of the single-layer transmission.

13. The system according to claim 10, wherein the DCI Format 1A further comprises the following signaling:
Format 0 or Format 1A selection signaling, resource assignment scheme selection signaling, resource block assignment signaling, transmit power control signaling, downlink assignment index signaling, and cyclic redundancy check signaling.

14. The system according to claim 11, wherein united coding of the any two bits is adopted to distinguish the transmit diversity from the single-layer transmission, and in the case of the single-layer transmission, to determine whether the single-antenna port is antenna port 7 or antenna port 8.

15. The system according to claim 14, wherein
the united coding scheme is: "00" indicating transmit diversity, "01" indicating a single-layer transmission and its corresponding antenna port 7, "10" indicating a single-layer transmission and its corresponding antenna port 8, and "11" being reserved.

16. The system according to claim 9, wherein
the indication signaling for indicating the single-antenna port is any one bit of the following signaling bits: the HARQ process number signaling bits, the NDI signaling bit, the RV signaling bits, and the MSB signaling bits of the MCS signaling bits; wherein the any one bit is used for determining whether the single-antenna port in the single-layer transmission is antenna port 7 or antenna port 8.

* * * * *